(12) United States Patent
Lu et al.

(10) Patent No.: US 8,127,533 B2
(45) Date of Patent: Mar. 6, 2012

(54) SYSTEM AND METHOD FOR POWER PRODUCTION USING A HYBRID HELICAL DETONATION DEVICE

(75) Inventors: Frank K. Lu, Arlington, TX (US);
Philip K. Panicker, Arlington, TX (US);
Donald R. Wilson, Arlington, TX (US);
Jiun-Ming Li, Madou Township (TW)

(73) Assignee: Board of Regents, The University of Texas System, Austin, TX (US)

( * ) Notice: Subject to any disclaimer, the term of this patent is extended or adjusted under 35 U.S.C. 154(b) by 19 days.

(21) Appl. No.: 12/552,425

(22) Filed: Sep. 2, 2009

(65) Prior Publication Data

US 2009/0322102 A1 Dec. 31, 2009

Related U.S. Application Data

(63) Continuation of application No. 11/877,358, filed on Oct. 23, 2007, now abandoned.

(51) Int. Cl.
*F02C 5/00* (2006.01)
*F02C 5/02* (2006.01)
*F02C 1/00* (2006.01)
*F02K 7/02* (2006.01)

(52) U.S. Cl. ........... 60/247; 60/772; 60/39.38; 60/39.76
(58) Field of Classification Search .................... 60/247, 60/39.38, 39.76, 772, 783
See application file for complete search history.

(56) References Cited

U.S. PATENT DOCUMENTS

| | | | | |
|---|---|---|---|---|
| 5,282,354 A | * | 2/1994 | Keller | 60/778 |
| 5,353,588 A | * | 10/1994 | Richard | 60/39.38 |
| 6,062,018 A | * | 5/2000 | Bussing | 60/39.39 |
| 6,308,740 B1 | * | 10/2001 | Smith et al. | 137/892 |
| 6,446,428 B1 | * | 9/2002 | Kaemming et al. | 60/247 |
| 7,055,308 B2 | * | 6/2006 | Pinard et al. | 60/247 |
| 7,367,194 B2 | * | 5/2008 | Murayama et al. | 60/776 |
| 7,526,912 B2 | * | 5/2009 | Tangirala et al. | 60/247 |
| 7,818,956 B2 | * | 10/2010 | Rasheed et al. | 60/39.76 |
| 2002/0059793 A1 | * | 5/2002 | Kaemming et al. | 60/204 |
| 2002/0078679 A1 | * | 6/2002 | Kaemming et al. | 60/204 |
| 2005/0210879 A1 | * | 9/2005 | Murayama et al. | 60/776 |
| 2006/0254252 A1 | * | 11/2006 | Rasheed et al. | 60/39.38 |
| 2006/0260291 A1 | * | 11/2006 | Vandervort et al. | 60/39.76 |
| 2007/0180811 A1 | * | 8/2007 | Rasheed et al. | 60/39.76 |
| 2008/0115480 A1 | * | 5/2008 | Rasheed et al. | 60/39.76 |
| 2008/0273969 A1 | * | 11/2008 | Murrow et al. | 415/182.1 |
| 2009/0193786 A1 | * | 8/2009 | Murrow et al. | 60/39.78 |
| 2010/0186370 A1 | * | 7/2010 | Daniau et al. | 60/247 |
| 2010/0242435 A1 | * | 9/2010 | Guinan et al. | 60/247 |

* cited by examiner

*Primary Examiner* — Ehud Gartenberg
*Assistant Examiner* — Gerald Sung
(74) *Attorney, Agent, or Firm* — Chowdhury & Georgakis, P.C.

(57) ABSTRACT

The system and method described herein uses a hybrid pulsed detonation engine (PDE) system to drive a turbine that powers an electric generator. The combustion chamber of the PDE is shaped in a helical form, so that the external length of the section is reduced, while maintaining the distance for acceleration to detonation. This allows the achievement of deflagration to detonation transition without the help of turbulence enhancing obstacles, while keeping the overall size of the detonation tube small. The PDE output can be scaled by: increasing the cross sectional area of the detonation chamber; increasing the number of detonation tubes; and increasing the frequency of operation of the PDE. The replacement of conventional deflagrative internal combustion engines, including gas turbines and reciprocating engines, with pulsed detonation engines for electric power generation, may provide fuel savings and have a lower environmental impact.

24 Claims, 5 Drawing Sheets

SYSTEM AND METHOD FOR POWER PRODUCTION USING A HYBRID HELICAL DETONATION DEVICE

CROSS-REFERENCE TO RELATED APPLICATIONS

This is a continuation of application Ser. No. 11/877,358 filed Oct. 23, 2007, abandoned on Nov. 8, 2010.

BACKGROUND OF THE INVENTION

The present invention relates generally to electric power generation. More particularly, the present invention provides a system and method for using hybrid pulsed detonation engines (PDEs) in electric power generation.

It is well accepted that detonation is a much more efficient form of combustion than deflagration. Consequently, PDEs have a very high theoretical efficiency. Due, in part, to their high efficiencies, PDEs are receiving increased interest as a viable propulsion system for supersonic and hypersonic aircraft. The Chapman-Jouget (C-J) detonation process yields higher pressures and temperatures in cycle thermal efficiencies, which exceeds that of conventional jet engines.

In conventional gas turbine engines, a compressor is used to increase the static pressure of the fluid before heat addition within the combustor. The gas turbine engines are modeled on the Brayton engine cycle, which features a constant pressure heat addition. Gas turbines have a drawback in that while the total temperature is increased, the total pressure of the fluid suffers a very small drop and the density of the fluid drops significantly. In contrast, in PDEs, a compressor is not required because detonation waves do the work of compressing the gas and deriving energy from the fuel. The constant volume detonation combustion process causes a rapid and extreme increase in pressure, temperature and density, whereby much more useful work can be produced from the working fluid. Thus, the PDEs are extremely efficient in the use of the fuel energy.

In addition to their high efficiencies, PDEs also have simpler design geometries and fewer moving parts compared to conventional engines, thereby reducing overall costs and also making them compact, in terms of cross sectional area.

The advantages above, including efficiency and compact size, make the PDE a desirable candidate for incorporation into an electric power generation system. PDE-driven electric generators could also be desirable for co-generation and combined cycle power production, such as with the addition of fuel cells and/or steam production systems.

PDEs being small and light, can be easily maintained and hence can be used for residential or small-scale power generators, which today make use of internal combustion reciprocating engines running on gasoline. It is widely known that the more popular gasoline engines are less efficient than diesel engines. PDEs, which have higher theoretical efficiencies than the diesel engines, would be able to deliver better fuel efficiencies. A PDE-based power generator could provide a compact and portable power source for remote or emergency situations.

PDEs can be run on a wide variety of fuels, including cheap readily available fuels such as methane, propane, natural gas, coal gas, etc. The ideal PDE fuel would be hydrogen, and as such it is ready for future fuel systems. Liquid fuels, such as gasoline, kerosene, jet fuels, etc., that can be gasified, can also be used in PDEs. Detonations also produce a more thorough combustion of the fuel, thereby reducing the emissions of carbon monoxide. PDE-powered electric generation has environmental advantages over conventional generation methods, such as coal-fueled generation systems.

FIG. 1 illustrates a conventional electrical power generation system 100 employing a gas turbine engine 110. A large compressor 120 feeds compressed air into the intake of the jet combustor 110, where fuel is mixed and continuously burned to produce energy. A conventional turbine 140 is driven by the exhaust of from the combustor. The turbine 140 and gearing 150 includes a speed governor and a transmission system. The gear 150 transfers the rotational motion to the shaft of a generator 160, run at constant speed.

While PDEs do have advantages over conventional jet engines, they also pose challenges to their use in electric power generation. For example, when integrating a turbine with a PDE, the turbine blades will be subjected to shock waves, very high pressures and temperatures. The turbine blades can be protected in these harsh conditions by including a detonation diffracting plenum chamber and a shock deflecting stator stage before the multiple rotor stages of the turbine. The plenum chamber has a larger cross sectional area than the detonation chamber. The exhaust from the one or more detonation tubes flows into the plenum before being channeled into the turbine chamber, as seen in FIG. 2A 230 and FIG. 4. Studies have shown that turbines can survive repetitive detonations (shock waves) with no significant damage. (Rasheed et al., 41$^{st}$ AIAA/ASME/SAE/ASEE Joint Propulsion Conference & Exhibit, Tucson, Ariz., 2005, AIAA-2005-4209).

SUMMARY OF THE INVENTION

The present invention provides an apparatus, a system, and a method to generate useable electric power using the output from a PDE.

One aspect of the present invention is to compensate for the pulsing nature of the PDE.

Another aspect of the present invention compensates for the high temperatures imposed on the turbine rotor and stator from the detonation shock wave induced inside the detonation chamber.

Another aspect of the present invention compensates for the pressure loading, which is caused by the detonation shock wave, imposed on the turbine rotor and stator.

Another aspect of the present invention is to match the rotational speeds and torques of the turbine and the generator.

Another aspect of the present invention is a modified helical tube detonation chamber, which allows combustion to start as a slow speed deflagration, which is initiated by a low energy spark and then naturally transition to a detonation wave, whilst providing a reduced overall length of the engine, keeping the engine to a small and practical form.

Another aspect of the present invention is to provide a means for rapid filling of a long detonation tube.

Yet another aspect of the present invention is to provide a source of scalable power by multiple means, to include: increasing the area of the detonation tube; increasing the number of detonation tubes; and increasing the frequency of the operation of the engine.

Several suitable applications result from the methods and devices described herein. Those skilled in the art will further appreciate the above-noted features and advantages of the invention together with other important aspects thereof upon reading the detailed description that follows in conjunction with the drawings.

BRIEF DESCRIPTION OF THE FIGURES

For a more complete understanding of the features and advantages of the present invention, reference is now made to the detailed description of the invention along with the accompanying figures, wherein.

DETAILED DESCRIPTION OF THE INVENTION

Figure 1:
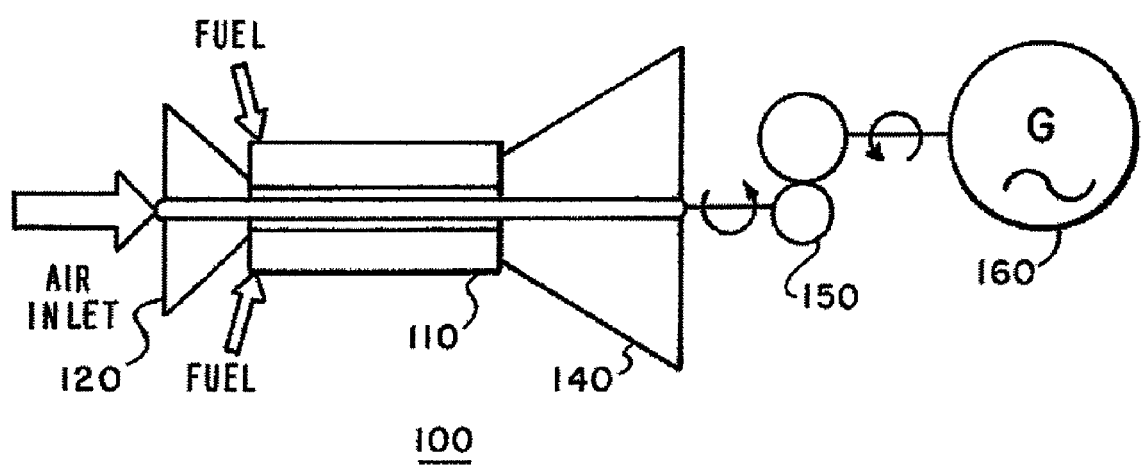
FIG. 1 illustrates the components of an electrical generator system incorporating a conventional gas turbine engine.
Figure 2A:
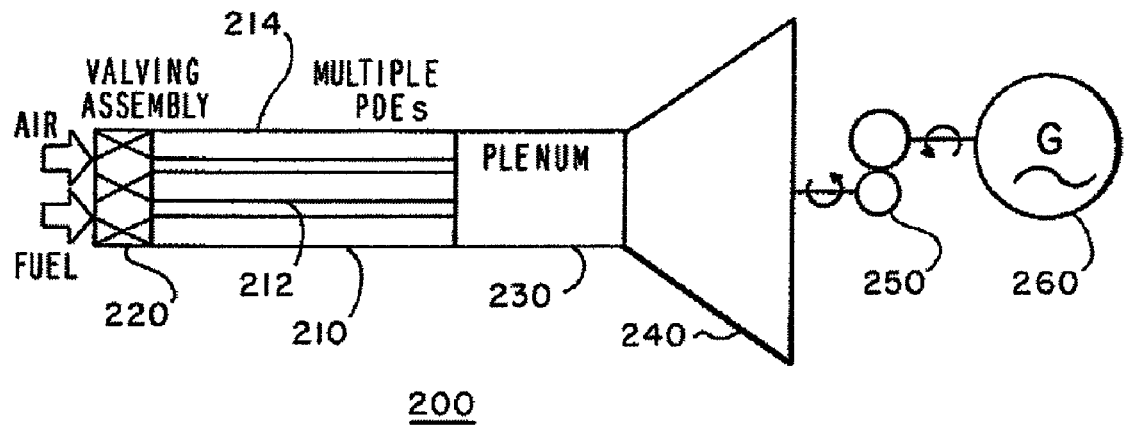
FIG. 2 depicts an electricity generating system which incorporates multiple PDEs.
Figure 2B:
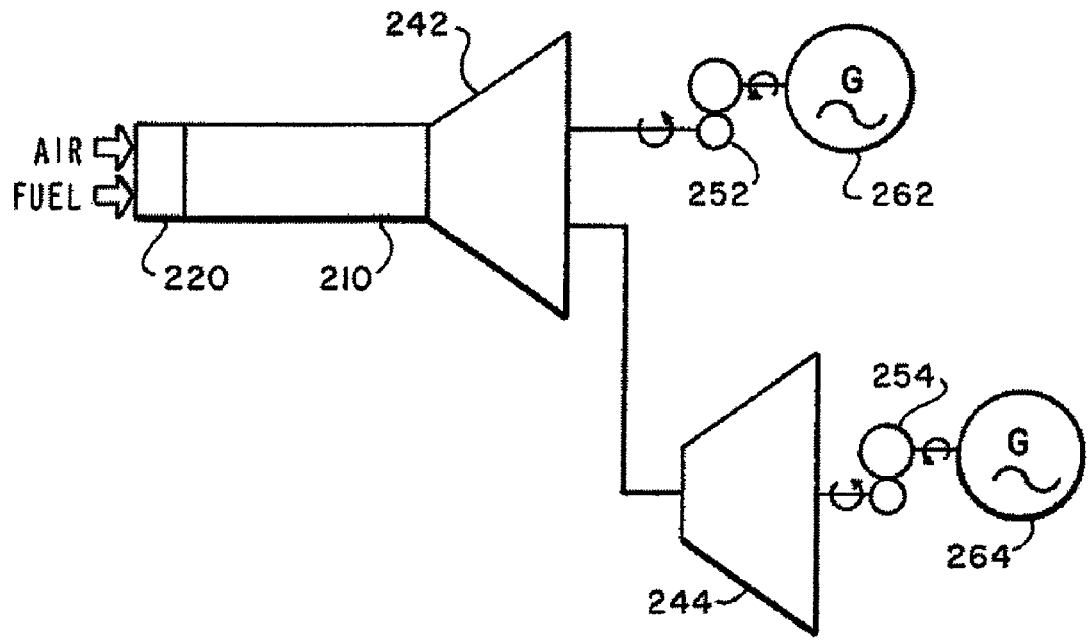

The invention, as defined by the claims, may be better understood by reference to the following detailed description. The description is meant to be read with reference to the Figures contained herein. This detailed description relates to examples of the claimed subject matter for illustrative purposes, and is in no way meant to limit the scope of the invention. Element numerals are consistent, where possible, across Figures. The specific aspects and embodiments discussed herein are merely illustrative of ways to make and use the invention, and do not limit the scope of the invention.

A pulsed detonation engine (PDE) in its simplest form essentially consists of a constant area tubular combustion (detonation) chamber with inlet valves to control the flow of fluid into the detonation chamber. The PDE cycle has four states. In the filling stage, the fuel and air inlet valves are opened to allow a fuel and air mixture to fill the tube. This is followed by the initiation and detonation stage, when ignition is started and a detonation wave is allowed to pass through the mixture, compressing the fluid and releasing large amounts of energy, causing a sudden rise in temperature, pressure and density of the fluid. When the detonation wave has exited the tube, a next stage initiates, namely the blow down stage, during which an expansion wave travels into the tube and reaches the end wall, causing the high pressure gas to exhaust outward, causing thrust. The blow down stage is followed by a purge stage, when cold air is let into the tube to cool and clean the tube, removing, for example, burnt gases. Without this step the next charge of fuel-air mixture that is about to be discharged into the tube may ignite.

The thrust of the PDE is directly proportional to the frequency of repetition of the cycle described above. Of the four stages, the filling and purging stages may take the longest time. Hence, shorter tubes can achieve faster detonation frequencies, while longer tubes take longer to fill.

While, some materials are extremely explosive in air, most practical fuels are not readily detonable. There are several means to cause a fuel-air mixture within a constant area tube to detonate. One method is to use a high energy ignition source to impart a large amount of energy to the mixture causing it to detonate. Another method is to start a deflagration reaction with a low energy ignition and then transition to detonation by using turbulence causing devices that enhance mixing. This is known as Deflagration to Detonation Transition (DDT). The most commonly used DDT devices are Shchelkin spirals or other obstacles. However, these devices can create drag that results in loss of thrust, create hot spots that can pre-ignite the fuel-air mixture before the appropriate time, and disintegrate due to the strong thermal and pressure loading caused by the detonations. In turn, these devices may require cooling or periodic replacement. Within a long constant area tube, a deflagration process will eventually accelerate to a detonation, if the tube is long enough and heat is constantly added. This natural DDT length can range from a few meters to a few tens of meters, depending on how energetic the fuel is.

Figure 3:
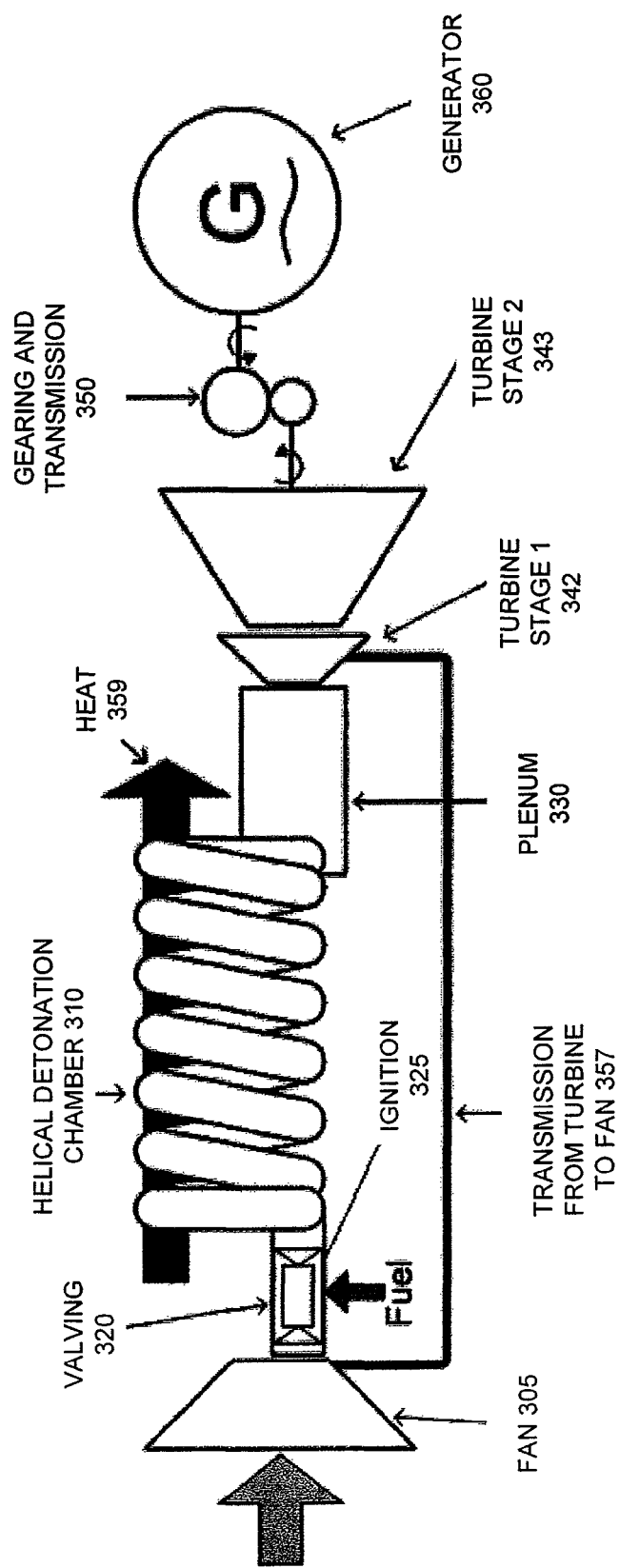
FIG. 3 illustrates an exemplary embodiment of the present invention comprising a hybrid PDE, having a helical shaped detonation chamber.

The present invention utilizes the natural tendency for the occurrence of detonations within long tubes, while not increasing the overall length of the engine, by using helical detonation tubes 310 that can, in turn, be compressed into a smaller form factor, as shown for example in FIG. 3.

The present invention can initiate the ignition, which will then naturally accelerate into a detonation wave, using only a low energy spark, 325.

The cell size of a fuel-air mixture has been widely accepted as a measure of its detonability, critical initiation energy, critical diameter of the detonation tube and other parameters. The cell size is the width of diamond shaped patterns left behind by the detonation waves within tubes. The smaller the cell size, the more energetic and easily detonable the mixture is. A list of cell sizes for various fuel-air mixtures at stoichiometric conditions is given in Table 1. Cell size is often denoted by $\lambda$ in current literature.

TABLE 1

| Fuel | Cell width (mm) | Pressure (Atm) | Temperature (° C.) | Reference |
|---|---|---|---|---|
| Hydrogen | 10.9 | 1 | 22 | Austin and Shepherd (2003) |
| Methane | 280 | 1 | 22 | Moen et al. (1984) |
| Acetylene | 9 | 1 | 22 | Knystautas et al. (1982) |
| Ethylene | 22.8 | 1 | 22 | Austin and Shepherd (2003) |
| Propane | 51.3 | 1 | 22 | Austin and Shepherd (2003) |
| Benzene | 126 | 1 | 100 | Stamps et al. (2006) |
| Hexane | 51.1 | 1 | 22 | Austin and Shepherd (2003) |
| Octane | 42 | 1 | 100 | Tieszen et al. (1991) |
| JP-10 | 60.4 | 1 | 100 | Austin and Shepherd (2003) |
| JP-10 | 47 | 1 | 135 | Akbar et al. (2000) |
| JP-10 | 54.7 | 2 | 100 | Ciccarelli and Card (2006) |
| Decane | 42 | 1 | 100 | Tieszen et al. (1991) |
| Jet-A | 45 | 1 | 135 | Akbar et al. (2000) |
| JP-4 | 45 | 1 | 100 | Tieszen et al. (1991) |

Citations to the References of Table 1 are as follows: Akbar et al., 2000, "Detonation Properties of Unsensitized JP10 and Jet-A Fuels in Air for Pulse Detonation Engines," AIAA Paper 2000-3592; Austin et al., 2003, Combustion and Flame, Vol. 132, pp. 73-90; Bull et al., 1982, Combustion and Flame, Vol. 45, pp. 7-22; Ciccarelli et al., 2006, AIAA Journal, Vol. 44, No. 2, pp. 362-367; Kaneshige et al., "Detonation Database, 1999," Explosion Dynamics Laboratory Report FM97-8, GALCIT; Moen et al., 1984, Progress in Astronautics and Aeronautics, Vol. 94, pp. 55-79; Stamps et al., 2006, Combustion and Flame, Vol. 144, pp. 289-298; and Tieszen et al., 1991, Combustion and Flame, Vol. 84, pp. 376-390.

In order for detonation to take place within a circular tube, its diameter must be equal to or larger than the cell size of the fuel-air mixture. Thus, the diameter of the tube may be designed to at least accommodate a type of fuel for which it is intended to be used. Larger diameters can accommodate multiple fuel types. For example, a tube having 25 cm internal diameter can yield detonation of propane, methane, kerosene and other fuels at stoichiometric and standard pressure and temperature initial conditions. Similarly, a tube of 10 cm internal diameter can be used for propane, kerosene, Jet-A fuels, and other fuels.

The DDT run-up distance for most fuel-air mixtures is about 40 times the cell size. Thus, the desired length of the detonation tube can be determined from the cell size of the fuel.

A standard length of about 15 m can be used with a variety of fuels. The present invention wraps the detonation tube into a helix compacting the over all length, while maintaining the desired DDT run up distance. The reshaped helical tube can fit within desired engine enclosures.

The location of the DDT is often distinguished in long tubes by the presence of a bulge that is produced due to the over-pressure experienced at that point by the formation of a detonation wave. Thus, only the area around the predicted DDT location in the helical tube may be reinforced to protect it from the over-pressure, rather than reinforcing the entire tube length.

In a hybrid PDE design, the combustor in a gas turbine engine is replaced by a PDE. For a PDE, high initial compression ratios are not required. As a result, only a single stage fan is required to supply air into the PDE. Components of a hybrid PDE may be a compressor with one or more stages, one or more pulsed detonation combustors, and a turbine with one or more stages. A turbine stage can drive the compressor. Although initial high compression is not required, a compressor may supply, for example, cooling air. Still other PDE systems may include a nozzle, typically used to accelerate flow in aircraft propulsion applications.

For a PDE-based electric power plant, the goal is to get maximum possible shaft work out of the exhaust flow. Thus, the turbines 342, 343 drive one or more generators through the transmission and gearing systems, along with the fan 305, as shown for example in FIG. 3. Note that FIG. 3 shows only one generator 360.

For a PDE-based electric power plant, the PDE will have to be valved 320 in order to control its operation. The fan 305 and the valves 320, as shown for example in FIG. 3, may be electrically powered or may be powered mechanically by torque transmission from the turbine. Electrically driven fan and valves may also be electrically controlled, such as by intelligent digital control systems, which can monitor and control the entire system.

For a PDE-based electric power plant, the fan may be replaced by a motor driven compressor or fan, which allows for good regulation and control of the flow of air into the combustor and for adequate cooling.

It is desirable in PDE-based electric power plant, for the detonation tubes, the fluid supply lines, the valves, the turbines, the transmission and the generator to be instrumented to allow real-time monitoring and controlling of the system. This can be accomplished using, for example, manual or digital systems, such as a computerized monitoring and control system.

Figure 4:
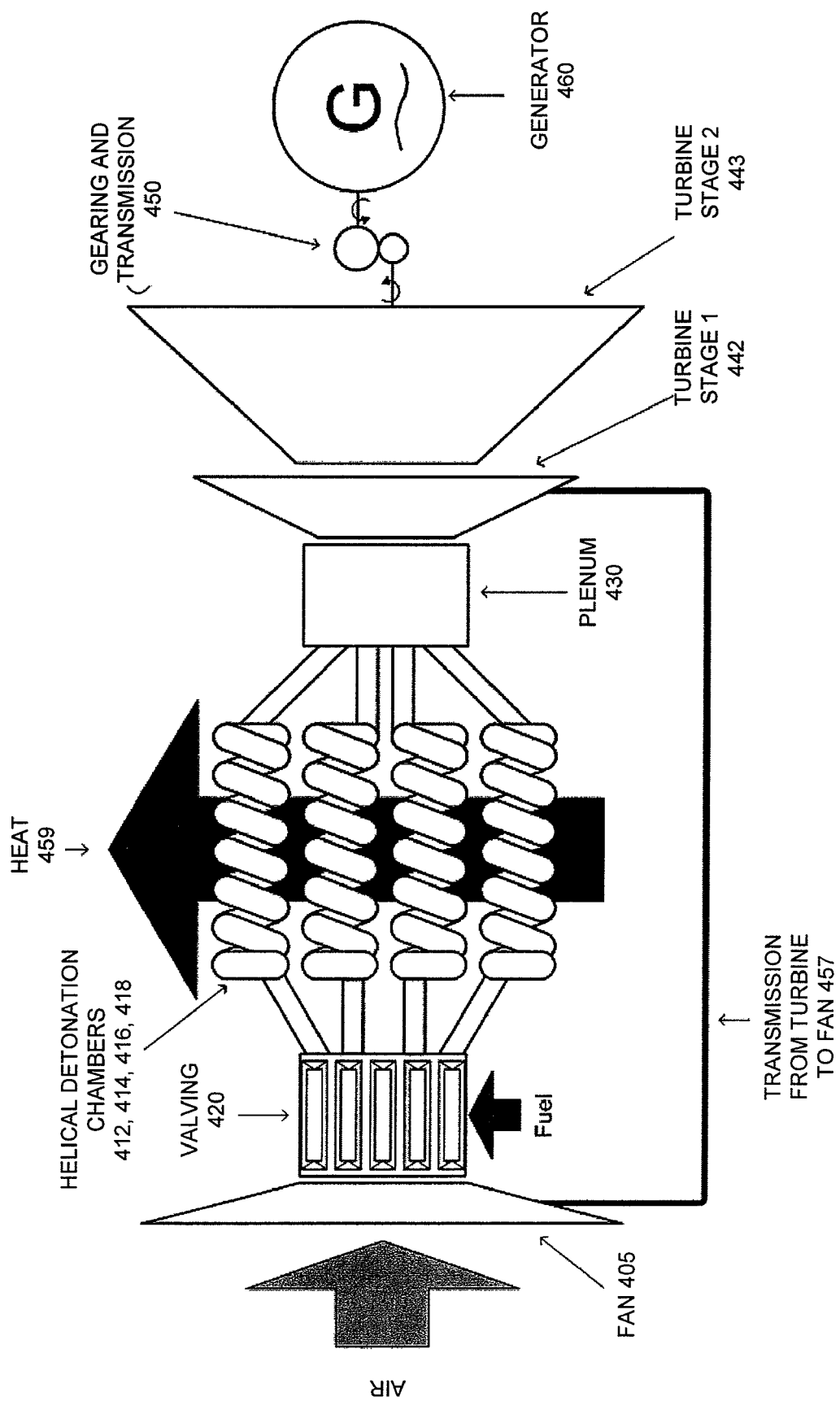
FIG. 4 depicts an exemplary embodiment of the present invention with a PDE having multiple hybrid detonation chambers and a generator connected through gearing to a second stage turbine.
Figure 5:
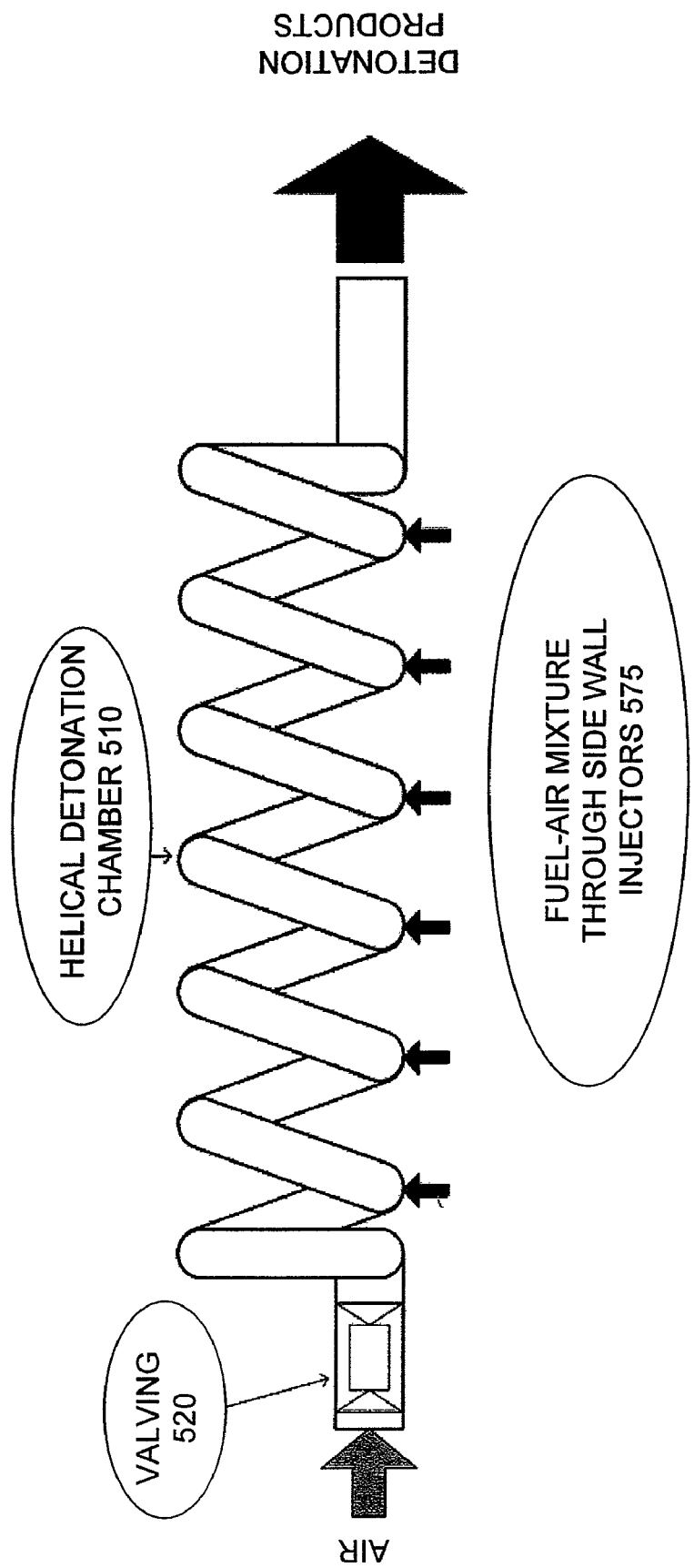
FIG. 5 depicts an exemplary embodiment of the present invention illustrating multiple sidewall injectors, which enable rapid filling of gas into the helical detonation chamber.

Embodiments of a PDE-based electric power plant, in accordance with the present invention, may have the following components: an air delivery system consisting of a fan driven by a turbine stage 342 or a separate fan or compressor system driven by an electric motor; a fuel storage and delivery system; valving for regulation of air and fuel supply 320 to the detonation tubes; one detonation tube 310 or many detonation tubes 412, 414, 416, 418 operated in a sequential manner; a plenum chamber to condition the exhaust flow of the detonation tubes and to diffract shock waves and detonation waves; multi-stage turbines 342, 343 to extract maximum permissible shaft work out of the high energy exhaust flow; a gearing and transmission system 350 to transmit the torque; one or more generators 360 to produce electric power from the mechanical power of the turbines; and intelligent digital monitoring and control system, not shown. As will be understood by one of ordinary skill in the art and as illustrated, e.g., in FIGS. 3-5, each detonation tube has an upstream end (left end in the figures), a downstream end (right end in the figures), and a longitudinal axis extending along the length of the tube from the upstream end to the downstream end. As seen in FIG. 4, the multiple detonation tubes 412, 414, 416 and 418 have non-coincident longitudinal axes.

In a PDE-based power generation system, the heat from the detonation tubes 359, 459 can be utilized for co-generation of energy, by transferring the heat to fuel cells. In addition, or in the alternative, heat form the detonation tubes may be used for steam production that may be used for other industrial processes.

Long detonation tubes may take a longer time than desired to fill up with fluid, if the filling is done from one end (upstream end). The filling and purging takes the longest fraction of the whole PDE cycle time, thus preventing higher operational frequencies. It is desirable to have the capability of higher frequencies, because, in part, thrust is directly proportional to frequency of operation. Embodiments of the present invention feature injection by side-wall injectors 575, which are disposed along the length of the tube, i.e., between the upstream and downstream ends of the tube, so that the filling can be done quickly, as shown for example in FIG. 5. In turn, higher frequencies can be achieved.

Turbines are not generally intended to be operated under high pressures. However, in a PDE, the turbines will be subjected to repeated thermal and pressure shocks. The present invention compensates for these shocks, alleviating their effects. One such compensation is the use a plenum chamber to condition the exhaust flow.

In order for a detonation wave to transfer from a smaller diameter tube to a larger diameter tube without losing significant energy and then degenerate into a deflagration wave, the smaller diameter can be equal to or larger than 13 times the cell size, $13\lambda$. In the present invention, the helical tubes inner diameter may be only a few times larger than the cell size of the fuel, which is less than $13\lambda$. Thus, when the detonation wave travels from the helical detonation tube into the larger area plenum chamber, it will detach into a shock wave followed by a deflagration flame front. Another measure by which the turbine rotor and blades are protected, in accordance with the present invention, is to use a stator stage that is actively cooled and has fins that are shaped such that a shock is deflected away from the turbine blades.

In a multi-tube helical PDE, FIG. 4, the plenum chamber 430 conditions the flow from each detonation tube discharging into it before passing it to the turbine 442. When all tubes fire in a sequential order, only one tube will fire into the plenum chamber at any given moment. Thus, the plenum chamber 430 creates a continuous flow of energetic gas flow over the turbines, thereby removing the effect of the pulsed exhaust flow.

Another method for removing the effect of the pulsing of the flow on the turbines and consequently on the generator output, is to add a flywheel to the turbines so that the added moment of inertia causes the rotation to be smoothed out over the PDE cycle. This method can also be adopted in single detonation tube PDE-based power generators.

In multi-tube PDE-based power generators, higher combustion frequency will drive the turbines to spin continuously, diminishing the pulsating effect.

In large scale multi-tube PDE based power generators, each detonation tube of the PDE may be controlled by valves. Thus, one or more tubes can be shut off as desired, either to reduce thrust or for repair and maintenance. A multi-tube PDE design, in accordance with the present invention, allows the PDE to be run with only a selected number of tubes in operation, allowing it to be operated even when one or more tubes are offline, for repair, maintenance, or power demands, for example.

An intelligent digital control allows PDE-based power generators to run with varying numbers of detonation tubes. For example, a minimum number of detonation tubes can operate at times of low power demand and then additional detonation tubes can be brought online as the power demand increases. This feature is especially useful for electric power plants.

In yet another embodiment, the combustors, plenum chamber, and turbines are fitted with transducers to allow for active measurement of the operating parameters. The active measurements can be used to determine changes in control parameters. For example, pressure transducers provide feedback indicating if a detonation within the tube has occurred or if pressure has weakened due to a deflagration, in which case, the fuel supply can be appropriately adjusted with the fuel injection system.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiment and after consideration of the appended claims and drawing.

What is claimed is:

1. An electric power generating system comprising:
a pulsed detonation engine comprising a plurality of hybrid helical detonation tubes, which receive fuel and air and provide combustion exhaust;
a turbine which receives the combustion exhaust and provides rotational energy;
a generator which receives torque from the turbine and generates electric power; and a digital controller configured (a) to determine a number of the plurality of hybrid helical detonation tubes that are active, (b) to adjust the number of the plurality of hybrid helical detonation tubes that are active in response to power demands, and (c) to take any of the plurality of hybrid helical detonation tubes offline for maintenance, while maintaining operation of the pulsed detonation engine.

2. The system according to claim 1, further comprising:
a plenum which combines the combustion exhaust from the plurality of hybrid helical detonation tubes before feeding the combustion exhaust to the turbine.

3. The system according to claim 1, wherein
the turbine comprises at least two turbine stages, each subsequent stage drive by exhaust from a previous stage.

4. The system according to claim 3, further comprising:
a single stage axial fan which is driven by one of the at least two turbine stages.

5. The system according to claim 1, wherein
the turbine comprises an axial turbine.

6. The system according to claim 3, wherein,
each turbine stage drives a generator which produces electric power.

7. The system according to claim 5, wherein:
the axial turbine has two or more sections, each section having two or more stages.

8. The system according to claim 3, further comprising:
a gearing and transmission system to transfer torque from a first turbine stage to a compressor, and to transfer torque from a second turbine stage to the generator.

9. The system according to claim 1, further comprising:
a single stage axial fan, which supplies air to cool the plurality of hybrid helical detonation tubes.

10. The system according to claim 4, wherein:
the single stage axial fan supplies air for combustion within the plurality of hybrid helical detonation tubes.

11. The system according to claim 1, wherein:
a diameter of each of the plurality of hybrid helical detonation tubes is larger than a cell-size of a received fuel and air mixture.

12. The system according to claim 1, wherein:
the received fuel is gaseous, liquid, or derived from a solid fuel by gasification.

13. The system according to claim 1, wherein:
the fuel consists of any of propane, methane, natural gas, acetylene, kerosene, and diesel.

14. The system according to claim 2, further comprising:
transducers in the pulsed detonation engine, the plenum, and the turbine providing active measurement of system parameters and enabling control of the system in consideration of the active measurement.

15. The system according to claim 1, further comprising
a fuel injection system comprising electric solenoid injectors, which are compatible with digital computerized control, enabling frequency and volume of fuel injected adjustment.

16. The system according to claim 1,
wherein a portion of at least one of the plurality of hybrid helical detonation tubes corresponding to a predicted deflagration-to-detonation transition location in the at least one of the plurality of hybrid helical detonation tubes is reinforced.

17. The system according to claim 1, wherein each of the plurality of hybrid helical detonation tubes has an upstream end, the system further comprising:
one or more sidewall injectors for injecting fuel and air into at least one of the plurality of hybrid helical detonation tubes at one or more positions along the at least one of the plurality of hybrid helical detonation tubes other than the upstream ends thereof.

18. A method of generating electric power using an electric power generating system, wherein the system comprises:
a pulsed detonation engine comprising a plurality of hybrid helical detonation tubes, which receive fuel and air and provide combustion exhaust;
a turbine which receives the combustion exhaust and provides rotational energy;
a generator which receives torque from the turbine and generates electric power; and a digital controller configured (a) to determine a number of the plurality of hybrid helical detonation tubes that are active, (b) to adjust the number of the plurality of hybrid helical detonation tubes that are active in response to power demands, and (c) to take any of the plurality of hybrid helical detonation tubes offline for maintenance, while maintaining operation of the pulsed detonation engine, and wherein the method comprises:
injecting fuel and air into the pulsed detonation engine;
combusting the fuel and air in at least one of the plurality of hybrid helical detonation tubes of the pulsed detonation engine so as to produce combustion exhaust, and outputting the combustion exhaust to the turbine;

converting the combustion exhaust to torque in the turbine;
driving the generator stage using the torque from the turbine; and
outputting electric power from the generator.

19. The method according to claim 18, the method further comprising:
diverting heat generated from at least one of the plurality of hybrid detonation tubes to a fuel cell.

20. The method according to claim 18, the method further comprising:
diverting heat generated from at least one of the plurality of hybrid helical detonation tubes to a steam generator system.

21. The method according to claim 18, the method further comprising:
scaling the electric power output by varying a number of the plurality of hybrid helical detonation tubes that are used for combustion.

22. The method according to claim 18, the method further comprising:
scaling the electric power output by varying a combustion frequency in at least one of the plurality of hybrid helical detonation tubes.

23. The method according to claim 18, the method comprising:
a method of operating the pulsed detonation engine comprising:
filling the at least one of the plurality of hybrid helical detonation tubes with fuel and air during a filling phase;
causing the fuel and air to detonate during a detonating phase, wherein a detonation wave traverses at least a portion of the length of the at least one of the plurality of hybrid helical detonation tubes;
exhausting high pressure gas during a blow down phase, wherein the high pressure gas is exhausted creating thrust;
and purging the at least one of the plurality of hybrid helical detonation tubes with air before a next filling phase.

24. The method according to claim 18, further comprising:
utilizing computerized valve controls to determine a number of the plurality of hybrid helical detonation tubes that are active;
adjusting the number of the plurality of hybrid helical detonation tubes that are active in response to power demands; and
taking any of the plurality of hybrid helical detonation tubes offline for maintenance, while maintaining operation of the pulsed detonation engine.

* * * * *